United States Patent [19]

Shantz et al.

[11] Patent Number: 4,948,641

[45] Date of Patent: Aug. 14, 1990

[54] MULTIPLE LAYER CONTAINER FOR STORAGE OF HIGH PURITY CHEMICALS

[75] Inventors: David J. Shantz, Woodbury, Conn.; Thomas A. Armer, Westborough, Mass.; David V. Olson, Cromwell, Conn.

[73] Assignee: Olin Corporation, Cheshire, Conn.

[21] Appl. No.: 448,454

[22] Filed: Dec. 11, 1989

Related U.S. Application Data

[63] Continuation-in-part of Ser. No. 362,637, May 23, 1989, which is a continuation-in-part of Ser. No. 56,204, Jun. 1, 1987, abandoned.

[51] Int. Cl.$^5$ .................. B65D 23/00; B32B 27/08
[52] U.S. Cl. .................. 428/35.7; 215/12.1; 428/412; 428/421; 428/422; 428/519; 428/520; 428/215
[58] Field of Search .................. 215/12.1; 428/35.7, 428/412, 421, 422, 519, 520, 215

[56] References Cited

U.S. PATENT DOCUMENTS

| | | | |
|---|---|---|---|
| 3,647,612 | 3/1972 | Schrenk et al. | 161/165 |
| 4,272,585 | 6/1981 | Strassel | 428/413 |
| 4,317,860 | 3/1982 | Strassel | 428/421 |
| 4,327,137 | 4/1982 | Sawa et al. | 428/412 |
| 4,444,826 | 4/1984 | Sasaki et al. | 428/216 |
| 4,497,856 | 2/1985 | Iwasawa et al. | 428/421 |
| 4,517,247 | 5/1985 | Suzuki et al. | 428/421 |
| 4,585,694 | 4/1986 | Dehennau | 428/355 |
| 4,588,642 | 5/1986 | Ochiumi | 428/421 |
| 4,677,017 | 6/1987 | DeAntonis et al. | 428/421 |

FOREIGN PATENT DOCUMENTS 0012645  1/1982  Japan .................. 428/421

OTHER PUBLICATIONS

Japanese Patent Publication No. 60-47106 dated Oct. 19, 1985 to Kazado et al and assigned to Toppan Insatsu K.K.

*Primary Examiner*—James Seidleck
*Attorney, Agent, or Firm*—Dale Lynn Carlson

[57] ABSTRACT

This invention relates generally to multiple-layered thermoplastic structures. More specifically, it is concerned with a hollow multiple-layered container, preferably formed by co-extruding or co-injecting a first chemically resistant and non-contaminating inner layer and a second structurally reinforcing outer layer into a blow mold, together with a third layer comprising a copolymer blend and functioning as a tie-layer to bond said first layer and said second layer. The hollow multiple-layered container is used for the storage of high purity and highly reactive chemicals.

6 Claims, 1 Drawing Sheet

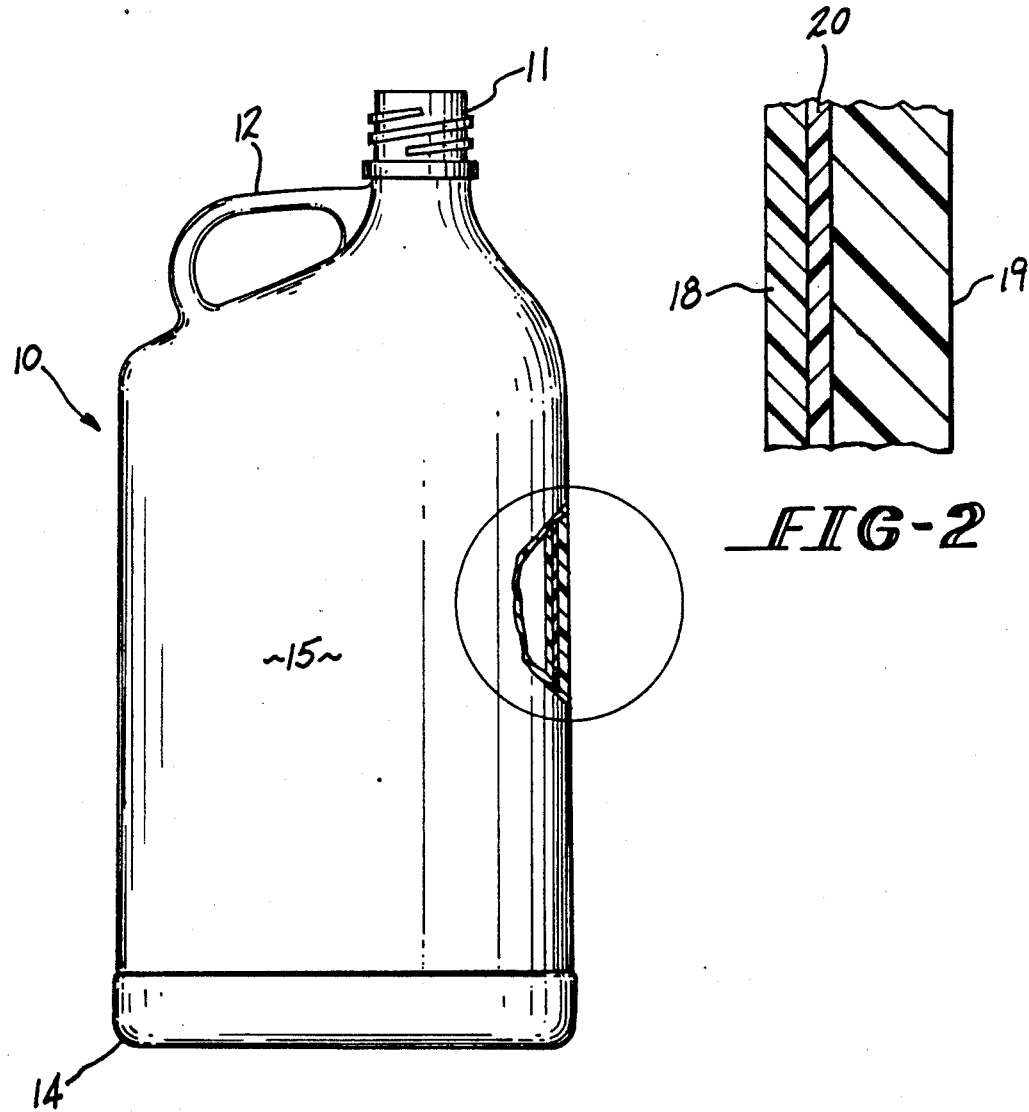

MULTIPLE LAYER CONTAINER FOR STORAGE OF HIGH PURITY CHEMICALS

This is a continuation-in-part application of U.S. patent application Ser. No. 362,637 filed on May 23, 1989, pending, which is a continuation-in-part application of U.S. patent application Ser. No. 056,204, filed Jun. 1, 1987, now abandoned.

This invention relates generally to multiple-layered thermoplastic structures. More specifically, it is concerned with a hollow multiple-layered container, preferably formed by co-extruding or co-injecting a first chemically resistant and non-contaminating inner layer and a second structurally reinforcing outer layer into a blow mold, together with a third layer comprising a copolymer blend and functioning as a tie-layer to bond said first layer and said second layer. The hollow multiple-layered container is used for the storage of high purity and highly reactive chemicals.

Where the chemicals are utilized in semiconductor applications, only extremely low levels of ionic, organic and particulate contaminants are permitted in the chemicals from any source, including any contamination due to leaching of contaminants from the container itself into the chemicals. Particle contamination is a critical parameter and must be kept at low levels in high purity chemicals, such as acids used in the semiconductor industry for etching or washing. Trace metals, such as sodium, potassium, lithium, boron or phosphorous shift the intrinsic resistivity of the semiconductor or create potentially corrosive products in moist environments under thermal stress. Where sodium, potassium or lithium contamination of the chemicals occurs, the contaminated chemicals are unacceptable for use since they adversely affect the life of the thus-treated semiconductors not met. Additionally, the presence of particles contaminating the chemicals is detrimental to semiconductor device fabrication since they tend to cause non-uniform film thicknesses on the devices and thus adversely affect thin film functionality, or the ability to achieve micron and submicron scale architecture in the wafer circuiting.

Traditionally, glass containers have been utilized for the storage of high purity semiconductor chemicals and more recently glass with plastic overcoating has been used because of safety considerations. Plastics such as polyethylene have also been used to fabricate containers ranging from a one gallon size to 55 gallon drums to bulk storage containers. However, each material has its limitations or disadvantages.

Where glass, or glass with a plastic overcoat, is used for the storage of acid, the glass containers can leach mobile ions, such as the aforementioned sodium, potassium, lithium, boron and phosphorous, into the chemicals. Glass is also known to "shed" particles or leach silica ($SiO_2$) which contributes to unacceptable particulate contamination. Additionally, glass containers are more easily broken than plastic containers.

Where plastic is used, such as polyethylene or polypropylene, highly reactive chemicals, such as 70% nitric acid, cause discoloration of the plastic used in the containers. This indicates that degradation of the plastic is occurring, thus risking contamination of the acid. These reactive chemicals also tend to cause stress cracking in the plastic containers, compromising the structural integrity of the container.

The need for improved containers to store and transport high purity and highly reactive chemicals has led to the use of a single layer of TEFLON ® fluorocarbon resins, sold under the tradename of TEFLON ® PFA (perfluoroalkoxy vinyl ether copolymer) by E. I. DuPont, in containers that store and transport high purity and highly reactive chemicals. However, such containers are extremely expensive and are limited in their use due to cost consideration.

Other plastics have been utilized in fabricating containers to store and transport high purity chemicals. When fluorinated resins such as PTFE (polytetrafluoroethylene) or PFA (tetrafluoroethylene-perfluoroalkoxy-ethylene) copolymer resin are used in order to take advantage of their inherent resistance to chemicals, an intermediate adhesive or tie layer is typically utilized to bond the chemically resistant inner layer (adjacent to the chemical) to a structurally reinforcing outer layer.

The adhesives employed as tie layers in the past have included polymers such as vinyl acetate polymer and a copolymer of ethylene and vinyl acetate to adhere a vinyl or vinylidene fluoride polymer or copolymer to an alpha-olefin polymer, such as polyethylene, polypropylene, polyester, polyamide, polycarbonate or polystyrene. Other adhesives have included blends of polymethylacrylate, polyethyl methylacrylate or polymethyl methacrylate with polyvinylidene fluoride or vinyl acetate copolymers. To promote adhesion, polyvinylidene fluoride surfaces have been treated with aprotic polar solvents prior to bonding with a polymethyl methacrylate.

New multi-layer bottles that can be fabricated by blow-molding and that provide excellent structural integrity and that can be used to store high purity chemicals would be highly desired by the electronics industry.

The foregoing problems associated with attempting to obtain a low cost, inert, non-contaminating, and a liquid and vapor barrier effective container for the storage and transportion of high purity and highly reactive chemicals are solved by the present invention.

The present invention relates to a hollow multiple-layered container providing an effective liquid and vapor barrier for the storage of high purity and highly reactive chemicals, said container having a top portion for filling and emptying and adapted to receive a closure means and a base portion upon which the container stands, said container comprising in combination:

(a) a first chemical resistant and non-contaminating layer fabricated of a fluoropolymer, said first layer being impermeable to said high purity and highly reactive chemicals;

(b) a second layer selected from the group consisting of polypropylene, polyethylene, polycarbonate, tetrafluoroethylene, polyacrylate, and polysulfone, said second layer being a structurally reinforcing layer for said bottle; and (c) a third layer being a tie-layer sandwiched between and bonding said first layer and said second layer, said third layer being a polymer blend comprising a polyethylene-vinyl acetate (EVA) and a block copolymer of styrene-ethylene-butadiene-styrene (SEBS) or styrene-butadiene-styrene (SBS), said blend containing a weight ratio of polyethylene-vinyl acetate to copolymer of between about 10:90 and about 90:10 based upon the total weight of EVA, SEBS, and SBS in the blend.

The advantages of this invention will become apparent upon consideration of the following detailed disclosure of the invention, especially when it is taken in conjunction with the drawings where:

FIG. 1 is a side elevational view of a hollow, multiple-layered blow molded container with a portion of the side broken away;

FIG. 2 is an enlarged side sectional view of the layered container of FIG. 1 showing a partial sectional view showing a portion of the side of the hollow, multiple-layered blow molded container of FIG. 1 with three layers bonded together.

FIG. 1 shows a side elevational view of a bottle or container 10 that is hollow and has multiple layers that is especially adapted for the storage and transport of chemicals with the high degree of purity required by the electronics industry. Container 10 is blow molded in a die by the introduction of pressurized air into the molten multi-layered cylinder or parison that is produced by a co-extrusion head (not shown).

Container 10 has a threaded top portion 11 that is designed to receive a cap or top (not shown). A solid or crimped handle 12 extends from the container 10 adjacent the top portion 11 to facilitate handling. The sidewall portion 15 connects the threaded top portion 11 and the base 14. The solid crimped handle 12 and the crimped base 14, or other features which cause pinch points can help mechanically fasten the multiple layers of container 10 together, depending upon the materials of construction.

In FIG. 2 the inner layer 18 is formed of an appropriate material that is resistant to the high purity and highly reactive chemicals being stored in the container 10, such as electronic grade nitric, hydrochloric or sulfuric acid. Other highly reactive chemicals that are storable in container 10 can include other strong oxidizers, such as phosphoric acid, hydrofluoric acid, peroxides, perchlorates or caustic based developers. Strong reducers, such as persulfates, bisulfates, iodine or hydrosulfites could be stored in container 10, as well as light sensitive developers. Plastic has been the preferred material for use in the inner layer 18 and must be resistant to discoloration, stress cracking, leaching and slivering. This inner layer 18 is suitably fabricated of a fluoropolymer. Suitable fluoropolymers include polyvinylidene fluoride (PVDF), perfluoroalkoxy vinyl ether (PFA), tetrafluoroethylene-hexafluoropropylene (FEP), ethylene tetrafluoroethylene (ETFE), and ethylene-chlorotrifluoroethylene (ECTFE) polymers. Preferred fluoropolymers for inner layer 18 are PFA or PVDF. This inner layer 18 can have a thickness when blow molded of between about 3 to about 15 mils, but the preferred thickness is from about 3 to about 5 mils.

Outer layer 19 serves as the structurally reinforcing layer to prevent the inner layer 18 from being damaged or ruptured during storage and transport. Outer layer 19 is suitably fabricated of polypropylene, polyethylene, polycarbonate, polyarylate, or polysulfone. Outer layer 19 is preferably fabricated of high density polyethylene. Blends of high density polyethylene and polyethylene-vinyl acetate can also be suitably employed in fabricating outer layer 19. This outer or structurally reinforcing layer 19 can have a thickness when blow molded of between about 10 to about 70 mils, but the preferred thickness is from about 30 to about 40 mils. To satisfy governmental regulations the minimum combined wall thickness of the inner and the outer layers 18 and 19 should be at least about 30 mils.

Outer or structurally reinforcing layer 19 mechanically retains and supports the inner layer 18 in its desired form by surrounding it. The two layers 18 and 19 can optionally be joined together by crimping of the layers at the threaded top portion 11, at the handle 12, at the base 14 and along the pinch points.

Tie layer 20 is utilized to bind the inner layer 18 to the outer layer 19, as seen in FIG. 2. The tie layer 20 is fabricated using a polymer blend. The polymer blend is preferably a binary blend of polyethylene-vinyl acetate (EVA) with styrene-ethylene-butadiene-styrene (SEBS) copolymer or styrene-butadiene-styrene (SBS) copolymer. Alternately, a ternary blend of EVA and SEBS (or SBS) with another component (such as high density polyethylene) can be utilized. Tie layer 20 can have an operable thickness of between about 1 mil to about 20 mils, a preferred thickness of between about 2 mils to about 15 mils, and a more preferred thickness of between about 2 mils and about 5 mils.

The container 10 is suitably formed by the blow molding of a parison, or molten multi-layered cylinder, produced by extruding the plastic materials comprising the individual layers through a co-extrusion head into a suitable mold. The plastic materials normally have a residence time of between about 1 to about 4 minutes in the co-extrusion process. The parison is blow molded by applying an air pressure of from about 90 to about 130 pounds per square inch. The container 10 is cooled in the mold. Once cooled the container 10 is removed from the mold.

The multiple-layered construction of container 10 is designed specifically to provide an effective barrier to liquid and vapor penetration. The impermeability of the container 10 to ionic species of the stored chemicals is a key feature. This impermeability has been found to be a function of the particular ionic species, the type of inert polymer utilized as the barrier layer of, for example, the inner layer 18, and the thickness of that layer. Container 10 has been designed to have an inner layer 18 that minimizes contamination to the container's contents. Preferably, inner layer 18 minimizes the total permeation or total migration rate of ionic species therethrough of less than or equal to about a 2 percent weight change of the stored chemical plus the container expressed as a percentage of the full container weight, according to (in accordance with the U.S. Packaging Institute's Procedure T-4101-84). This design standard can also be defined as a specific gram weight per square inches of exposed internal surface area over a designated length of time, such as 6 months.

A permeability cell was used to test the permeability or migration of ions through polymer films of varying thickness. The permeability cell consisted of two cylindrically shaped chambers each with about a four inch diameter circular cross section and about a 150 cubic centimeter volume. The two chambers were completely sealed from the surrounding air and were separated from each other by a test film of the desired polymer and thickness. One of the two chambers was filled with a solution of the desired ionic species which, in the instances tested here was 70% concentrated nitric acid, but which could equally well have been sulfuric, hydrochloric, hydrofluoric, or phosphoric acid or other highly reactive chemicals. The other chamber was filled with 18 megaohm distilled water. Both chambers were maintained at a temperature of about 25° C.±5° C. under a nitrogen gas atmosphere.

A conductivity probe calibrated from 0.20 $\mu$mhos to 200,000.00 $\mu$mhos was inserted into the chamber of distilled water. The conductivity of the distilled water changes over time in direct proportion to the ion content as ions migrate across the barrier test film. The permeation rate of the inner layer polymer samples was then determined from the conductivity change. The following data presented in Table I represents the statistical average of at least two samples of the impermeability of the inner layer polymer samples to 70% nitric acid at the indicated film thicknesses. Based on the permeability data, in each instance the acid weight loss presented as a percent of bottle weight was predicted for approximately a one gallon capacity container weighing about 333 grams empty.

TABLE I

Container Holding 70 Percent Nitric Acid at 25° C.

| | Thickness (mils) | Bottle Weight Loss (% of Bottle Weight) | Number of Days |
|---|---|---|---|
| PFA (Dupont's TEFLON ® PFA 350) | 2.00 | 1.3 | 180 |
| | 2.00 | 5.91 | 180 |
| | 5.00 | 0.01 | 180 |
| | 10.00 | 0.01 | 180 |
| PVDF (Soltex's SOLEF 1010) | 2.00 | 7.2 | 180 |
| | 5.00 | 0.4 | 180 |
| | 10.00 | 0.1 | 180 |

Compatibility of the inner layer 18 with the highly reactive and/or high purity chemicals stored in container 10 is also critical since the inner layer must both not react with the stored chemical and not contaminate it, such as by degradation. Compatibility also covers the amount of swelling and yellowing that occurs in an inner layer 18 of the container 10 after a highly reactive chemical has been stored in it for an extended period of time. To comply with governmental regulations, no more than a 2% weight change is allowable in plastic containers to be used for shipping and storing chemicals. Because yellow discoloration of the containers implies degradation of the inner layer is occurring, any change in color that resulted in a yellowness index reading of greater than 8 is deemed unacceptable. A yellowness index reading of 8 or greater indicates a visually distinguishable yellow color in the container material. The yellowness index was obtained by the method described in ASTM D 1925.

Swelling was tested by filling 1 gallon blow molded containers with 37% concentrated Olin Hunt hydrochloric acid and 70% concentrated Olin Hunt nitric acid. The containers were sealed and immersed in a thermostatic water bath that was maintained at about 140° F. for up to 14 days. All containers were at least 30 mils thick and those with multiple layers had varying inner layers about 10 mils thick combined with high density polyethylene outer layers 19. When a container was selected for sampling at a particular time during the test period, it was emptied, rinsed, air dried and weighed. Weight change was determined in accordance with the U.S. Packaging Institute's Procedure T-4101-84.

Tests for swelling indicated that Soltex's FORTIFLEX XF 450 high density polyethylene is not acceptable for storing 70% nitric acid because of greater than 2% weight change due to swelling during the 180 day period. DuPont's TEFLON PFA 350 and Soltex's SOLEF 1010 PVDF had less than 1% weight change due to swelling during the 14 day test period.

To test for yellowing 1 inch by 6 inch coupons of the polymers were immersed in Olin Hunt 37% hydrochloric acid and 70% nitric acid for periods up to 180 days. These coupons were removed, rinsed, dried and spectrally analyzed or measured by a Spectrogard ™ Color System spectrometer by Pacific Scientific. Coupons that after exposure had a yellowness index greater than 8 were deemed unacceptable.

The following TABLE II shows that unacceptable discoloration occurred in the ECTFE sold by Allied under the tradename HALAR 300 exposed to 37% concentrated hydrochloric acid and the HDPE sold by Soltex under the tradename FORTIFLEX XF 450 exposed to 70% concentrated nitric acid. The data reflects a time weighted average of the yellowness index.

TABLE II

| | PVDF (Solef 1010) | ETCFE (Halar 300) | PERFLUORALKOXY (PFA 350) | HDPE (Fortiflex XF 450) | FEP (FEP 300) |
|---|---|---|---|---|---|
| 37% HCl | | | | | |
| Yellowness Index | 6.5 | 40.1 | 4.7 | 4.7 | 4.6 |
| Time (Days) | 27 | 110 | 110 | 110 | 110 |
| 70% HNO$_3$ | | | | | |
| Yellowness Index | 6.3 | — | −2.0 | 52.9 | 3.3 |
| Time (Days) | 9 | — | 9 | 9 | 9 |

Particle contamination of the stored chemicals by the inner layer 18 preferably does not amount to more than 125,000 particles of less than 0.5 micron diameter per liter, while not contributing more than 50 parts per billion (ppb) each of certain specific ions, including copper, sodium, potassium, phosphorous, iron, boron, silicon or calcium. Particle and ion contamination was tested by filling a 1 gallon glass, PFA, PVDF, ETFE and HDPE with either 37% concentrated hydrochloric acid or 70% concentrated nitric acid, as shown, and monitored over a period of time. The time is shown as extending only 27 days. However, the testing continued beyond that time, but repeat data had not yet been obtained.

The ion analysis was accomplished by concentrating about 2 liters of the acid solution down to about 2 mil by heating to volatalize the ion boiling compounds. For the low mobile ions, such as potassium, sodium and lithium, the ionic concentration or contamination was determined by atomic absorption. An inductively coupled plasma analyzer was then used to determine the remaining individual ion count.

A Hiac Royco Model 4100 Particle Counter with a Model 3200 corrosive Liquid Sampler and a Model 346 BLL Corrosion Liquid Sensor were used to determine the number of particles contributed to the stored chemicals by the storage container. This state of the art equipment and methodology for particle analysis of the contribution of the storage container materials storing highly reactive chemicals indicates that glass contributes significantly more particles than the other materials tested, using the data in Table III for total particles between 0.5 and 15 microns per liter as a qualitative measure only. The samples were allowed to sit for approximately 24 hours to allow microbubbles to settle out. The samples were cooled in an ice bath for about 30 minutes to about 10° C. and then the liquid sampler was purged with nitrogen. The analyzer system was flushed twice with 18 megaohm-cm deionized water and calibrated prior to analyzing the acid sample.

The data in the following Table III show that ETFE had unacceptable (greater than 50 ppb) ion contamination for copper and HDPE was unacceptably excessive for calcium. Glass containers are known to contribute greater than 50 ppb metallic ion contamination and are therefore also unacceptable, leaving the FEP, PFA, PVDF and ECTFE containers as the preferred based solely upon ion contamination.

TABLE IV

| First Layer | Second Layer | Peel Strength lbs. per inch |
|---|---|---|
| PVDF | 80% Shell Kraton G-1651 SEBS 20% polyethylene | 0.7346 |
| PVDF | 80% Elvax 670 ethylene vinyl acetate 20% Shell Chemical polypropylene 7129 | 0.1544 |
| PVDF | 40% Elvax 670 ethylene vinyl acetate 60% Shell Chemical polypropylene 7129 | 0.2940 |
| PVDF | 80% Shell Kraton G-1651 SEBS 20% Shell Chemical polypropylene 7129 | 0.1983 |

TABLE III

IONIC AND PARTICLE CONTAMINATION CONTRIBUTION

| | Time (Days) | Ions (ppb) | | | | | | | Total Particles ($10^3$) per liter |
|---|---|---|---|---|---|---|---|---|---|
| | | Cu | Si | Ca | K | Na | Li | Fe | |
| DuPont FEP 100N | | | | | | | | | |
| 37% HCl | 0 | 0 | 0 | 0 | 0 | 0 | 0 | 0 | — |
| | 9 | 0 | 0 | 2 | 0 | 0 | 0 | 0 | — |
| | 27 | 0 | 0 | 2 | 0 | 0 | 0 | 0 | — |
| | 81 | 0 | 0 | 15 | 0 | 0 | 0 | 0 | — |
| | 180 | 0 | 0 | 15 | 0 | 0 | 0 | 0 | — |
| Allied Halar 300 ECTFE | | | | | | | | | |
| 37% HCl | 0 | 0 | 0 | 0 | 0 | 0 | 0 | 0 | — |
| | 9 | 0 | 0 | 5 | 0 | 0 | 0 | 0 | — |
| | 27 | 0 | 0 | 10 | 0 | 0 | 0 | 0 | — |
| | 81 | 0 | 0 | 10 | 0 | 0 | 0 | 0 | — |
| | 180 | 0 | 0 | 10 | 0 | 0 | 0 | 0 | — |
| Union Carbide HOPE UC 8007 | | | | | | | | | |
| 37% HCl | 0 | 0 | 0 | 0 | 0 | 0 | 0 | 0 | 0 |
| | 9 | 0 | 10 | 20 | 0 | 0 | 0 | 5 | 39 |
| | 27 | 0 | 10 | 20 | 0 | 0 | 0 | 5 | 53 |
| | 81 | 0 | 10 | 30 | 0 | 0 | 0 | 5 | — |
| | 180 | 0 | 10 | 50 | 0 | 0 | 0 | 5 | — |
| DuPont ETFE TEFZEL 280 | | | | | | | | | |
| 37% HCl | 0 | 0 | 0 | 0 | 0 | 0 | 0 | 0 | 0 |
| | 9 | 985 | 0 | 0 | 0 | 0 | 0 | 5 | 5 |
| | 27 | 1285 | 0 | 0 | 0 | 0 | 0 | 20 | 5 |
| | 81 | 1535 | 0 | 0 | 0 | 0 | 0 | 20 | 20 |
| | 180 | 1785 | 0 | 0 | 0 | 0 | 0 | 20 | 20 |
| DuPont PFA 350 | | | | | | | | | |
| 37% HCl | 0 | 0 | 0 | 0 | 0 | 0 | 0 | 0 | |
| | 9 | 0 | 0 | 5 | 0 | 0 | 0 | 5 | 51 |
| | 27 | 0 | 0 | 5 | 0 | 0 | 0 | 5 | 96 |
| | 81 | 0 | 0 | 10 | 0 | 0 | 0 | 5 | — |
| | 180 | 0 | 0 | 10 | 0 | 0 | 0 | 5 | — |
| Pennwalt Kynar 460 PVDF | | | | | | | | | |
| 37% HCl | 0 | 0 | 0 | 0 | 0 | 0 | 0 | — | — |
| | 9 | 0 | 5 | 5 | 0 | 0 | 0 | — | — |
| | 27 | 0 | 5 | 5 | 0 | 0 | 0 | — | — |

— = no data taken

The bonding strengths of various materials joined together in separate layers were tested on an Instron Peel Test Machine. The sample materials tested were ½ inch in width and the Test Machine had a cross head speed of 2 inches per minute. The measured peel strength was expressed in pounds per inch as shown in the following Table IV. Where the peel strength is expressed as "no tab", the Instron Test Machine was unable to peel apart the layers. All PVDF tested was Solef 1010, produced by the Soltex Polymers Division of Solvay & Cie Co. Kraton is Shell's styrene- ethylene-butylene-styrene or styrene-butadiene-styrene (SEBS or SBS) block copolymer. Soltex's Fortiflex brand polyethylene grade XF 450 was used. DuPont's ELVAX polyethylene-vinyl acetate was used in the desired grade in the second or outer layer.

| Shell Chemical 7129 Polypropylene | Elvax 360 | No Tab |
| Shell Chemical 7129 Polypropylene | 40% Elvax 670 60% polypropylene | No Tab |
| Shell Chemical 7129 Polypropylene | 40% Shell Kraton G-1651 SEBS 60% PVDF | 4.3478 |
| Shell Chemical 7129 Polypropylene | 20% Shell Kraton G-1651 SEBS 80% Polyethylene | 0.5107 |
| Shell Chemical 7129 Polypropylene | 60% Shell Kraton G-1651 SEBS 40% Polyethylene | No Tab |
| Soltex High Density Polyethylene Fortiflex XF 450 | 40% Shell Kraton G-1651 SEBS 60% Shell Chemical Polypropylene 7129 | 3.162 |
| Soltex | 20% Elvax 670 | 0.516 |

TABLE IV-continued

| First Layer | Second Layer | Peel Strength lbs. per inch |
|---|---|---|
| High Density Polyethylene Fortiflex XF 450 | 80% Shell Chemical Polypropylene 7129 | |

Three Layer Bottle*

| First Layer | Second Layer | Third Layer |
|---|---|---|
| Soltex's PVDF SOLEF 1010 | 50% Dupont's ELVAX 40-2W 50% Shell's KRATON G-1651 SEBS | Soltex's High Density Polyethylene Fortiflex XF-450 |

*In the three-layer bottle, the first layer had a 5–12 mils thickness, the second layer was 5–10 mils thick and the third layer was 15–45 mils thick.

The following examples are intended to illustrate, but in no way limit the scope of, the present invention.

EXAMPLE I

Blow Molding of a Three-Layer Container

Air pressure of about 90 to 130 pounds per square inch was used to blow mold a multiple layer container from a 3 layered parison of PVDF, HDPE and an adhesive layer of Elvax 40-2W/Kraton G-1651 blend. The adhesive layer was a 50/50 blend by weight. The PVDF was electronic grade Solef 1010 available from Soltex. The high density polyethylene was Fortiflex XF-450 from Soltex. The Kraton G-1651 was an SEBS copolymer available from Shell. The Elvax 40-2W was a copolymer of ethylene and vinyl acetate with a 40.0% vinyl copolymer acetate content from Dupont. All the materials had between 1 to 4 minute residence time in a Bekum Model BM-401 fine screw, 5 extruder system length to diameter ratios were 20:1 and compression ratios were 1.849, 1.849, 1.01, 1.01 and 1.04 for the extruders 1, 2, 3, 4, and 5 respectively. The heating temperature for the 5 heating zones from the feed zone to the pumping zone, respectively, for the PVDF were 330° F., 370° F., 430° F., 430° F., 430° F. The heating temperatures for 5 heating zones from the feed zone to the pumping zone, respectively for the HDPE were 310° F., 330° F., 335° F., 345° F., 345° F. The heating temperatures of the 3 heating zones from the feed zone to the pumping zone, respectively for the 50/50 blend of ELVAX 40-2W and Kraton G-1651 were 380° F., 400° F., 400° F. The PVDF extruder, was a 50 mm diameter extruder and was run at 35 RPM's. The HDPE extruder, was a 50 mm diameter extruder and was run at 20 RPM's. The Elvax 40-2W/Kraton G-1651 extruder, was a 38 mm diameter extruder and was run at 35 RPM's. The coextrusion die head was set at 420° F. in all 6 heating zones. The weight control of the Bekum BM-401 was set at 035; the timing sequence was 3100 -0800 - 0200 - 2800 - 0350 with the weight control set at 210 grams.

The materials were extruded to obtain a molten three-layer parison. The parison was captured in a shattle-mold and blown with filtered, dry air, 40–80 psi to obtain the mold temperature of from about 60° F. to 100° F. depending on the materials was blow molded to obtain a hollow, layered container. The container was ambient air cooled 20 to 60 seconds and then removed from the mold. About 500 containers were thus molded and averaged about 186 grams in weight. The PVDF inner layer had a thickness of from about 5 to about 12 mils, while the thickness of the HDPE outer layer varied from about 15 to about 40 mils. The tie layer ranged from about 5 to about 10 mils.

What is claimed is:

1. A hollow multiple-layered container providing an effective liquid and vapor barrier for the storage of high purity and highly reactive chemicals, said container having a top portion for filling and emptying and adapted to receive a closure means and a base portion upon which the container stands, said container comprising in combination:
    (a) a first inner chemical resistant and non-contaminating layer fabricated of a fluoropolymer, said first layer being impermeable to said high purity and highly reactive chemicals;
    (b) a second outer layer selected from the group consisting of polypropylene, polyethylene, polycarbonate, polyarylate, and polysulfone, said second layer being a structurally reinforcing layer for said bottle; and
    (c) a third layer being a tie-layer sandwiched between and bonding said first layer and said second layer, said third layer being a polymer blend comprising polyethylene-vinyl acetate and a copolymer of styrene-ethylene-butadiene-styrene or styrene-butadiene-styrene, said blend containing a weight ratio of polyethylene-vinyl acetate to copolymer of between about 10:90 and about 90:10 based upon the total weight of EVA, SEBS, and SBS in the blend.

2. The container according to claim 1 wherein the first layer is fabricated of polyvinylidene fluoride, perfluoroalkoxy vinyl ether, tetrafluoroethylene-hexafluoropropylene, ethylene tetrafluoroethylene, or ethylene-chlorotrifluoroethylene polymer.

3. The multiple-layered structure according to claim 2 wherein the first layer is between about 3 mils and about 15 mils thick.

4. The container according to claim 1 wherein the second layer has a thickness of between about 10 mils and about 70 mils thick.

5. The container according to claim 1 wherein said third layer has a thickness of between about 1 mil and about 20 mils.

6. The multiple-layered container of claim 1 wherein said first chemical resistant and noncontaminating layer is fabricated of polyvinylidene fluoride, said second layer is fabricated of polyethylene and said tie-layer is fabricated of a blend of polyethylene-vinyl acetate and a copolymer of styrene-ethylene-butadiene-styrene or styrene-butadiene-styrene.

* * * * *